United States Patent
Pauzon et al.

(10) Patent No.: US 11,865,614 B2
(45) Date of Patent: Jan. 9, 2024

(54) METHOD AND DEVICE FOR FEEDING GAS TO AN ADDITIVE MANUFACTURING SPACE

(71) Applicant: LINDE GMBH, Pullach (DE)

(72) Inventors: Camille Pauzon, Trollhättan (SE); Tanja Arunprasad, Munich (DE); Andres Torres, Munich (DE)

(73) Assignee: LINDE GMBH, Pullach (DE)

( * ) Notice: Subject to any disclaimer, the term of this patent is extended or adjusted under 35 U.S.C. 154(b) by 486 days.

(21) Appl. No.: 17/254,700

(22) PCT Filed: Sep. 25, 2019

(86) PCT No.: PCT/EP2019/025317
§ 371 (c)(1),
(2) Date: Dec. 21, 2020

(87) PCT Pub. No.: WO2020/064148
PCT Pub. Date: Apr. 2, 2020

(65) Prior Publication Data
US 2021/0114109 A1    Apr. 22, 2021

(30) Foreign Application Priority Data
Sep. 25, 2018 (EP) .................................... 18020463

(51) Int. Cl.
*B22F 10/322* (2021.01)
*B22F 10/28* (2021.01)
(Continued)

(52) U.S. Cl.
CPC ............ *B22F 10/322* (2021.01); *B22F 10/32* (2021.01); *B22F 10/85* (2021.01); *B22F 12/30* (2021.01);
(Continued)

(58) Field of Classification Search
CPC ........ B22F 10/28; B22F 10/32; B22F 10/322; B22F 10/34; B22F 10/77; B22F 10/85;
(Continued)

(56) References Cited

U.S. PATENT DOCUMENTS

2017/0165781 A1    6/2017    Veldsman et al.

FOREIGN PATENT DOCUMENTS

EP    3075470 A1    10/2016
EP    3170593 A1    5/2017

OTHER PUBLICATIONS

Grzegorz Moroz et al., "How Helium improves Additive Manufacturing of Ti—6Al—4V and IN718 parts", May 11, 2017, Acta Materialia., GB whole document.
(Continued)

*Primary Examiner* — Jenny R Wu
(74) *Attorney, Agent, or Firm* — MILLEN, WHITE, ZELANO & BRANIGAN, P.C.; Brion P. Heaney

(57) ABSTRACT

According to the present invention a method is provided for feeding a gas flow to an additive manufacturing space during a manufacturing process wherein the gas flow is established by a pump connected to the manufacturing space wherein the pump is controlled by a set differential pressure, and wherein the gas flow consists of Helium or the gas flow consists of a gas mixture comprising 30 Vol.-% Argon and 70 Vol.-% Helium or the gas flow consists of a gas mixture comprising 50 Vol.-% Argon and 50 Vol.-% Helium or the gas flow consists of a gas mixture comprising 70 Vol.-% Argon and 30 Vol.-% Helium.

18 Claims, 3 Drawing Sheets

Figure 1:
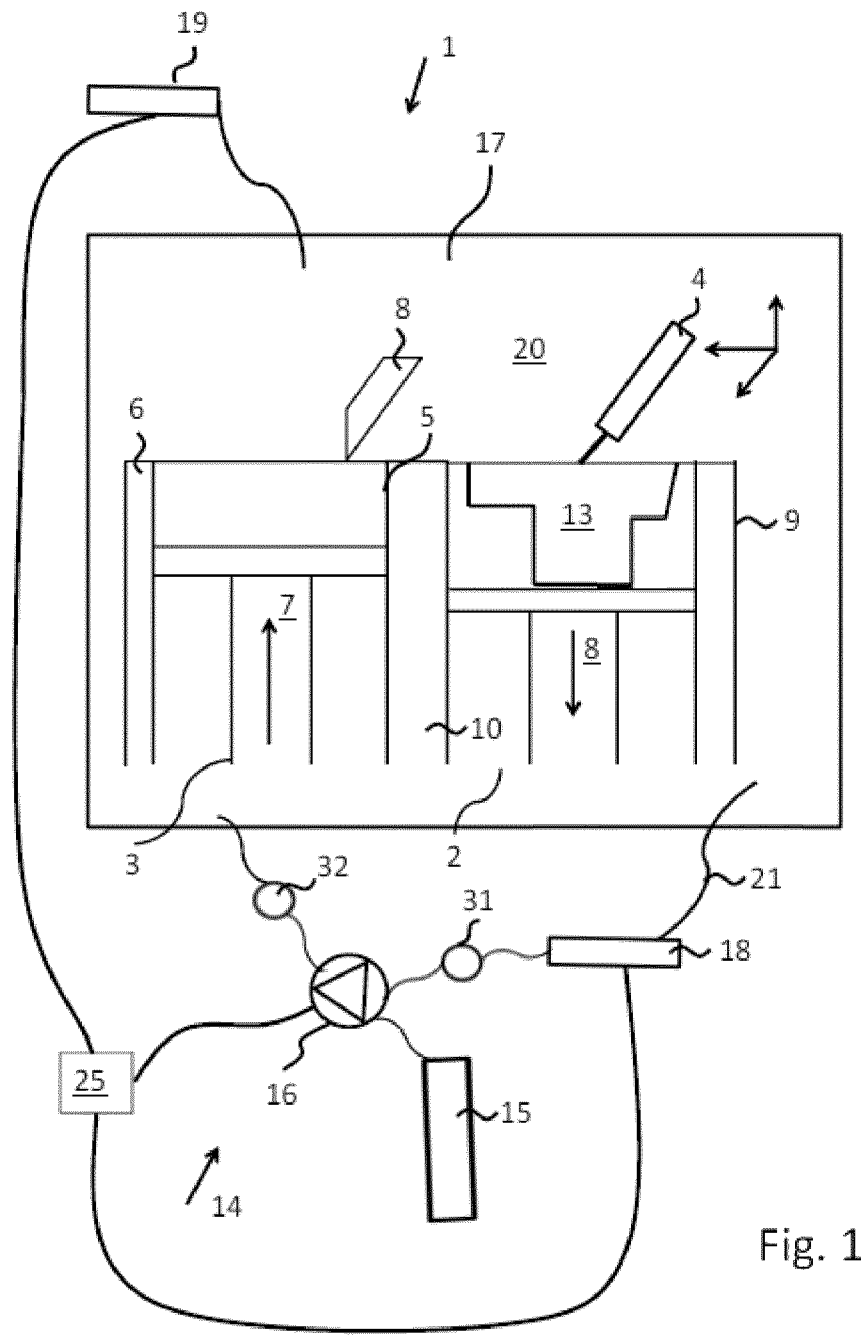

(51) Int. Cl.
*B22F 10/85* (2021.01)
*B22F 12/30* (2021.01)
*B22F 12/41* (2021.01)
*B22F 12/70* (2021.01)
*B33Y 10/00* (2015.01)
*B22F 10/32* (2021.01)
*B33Y 30/00* (2015.01)
*B33Y 50/02* (2015.01)
*B22F 10/77* (2021.01)
*B22F 12/00* (2021.01)
*B22F 12/90* (2021.01)
*B22F 10/34* (2021.01)

(52) U.S. Cl.
CPC .............. *B22F 12/41* (2021.01); *B22F 12/70* (2021.01); *B33Y 10/00* (2014.12); *B22F 10/28* (2021.01); *B22F 10/34* (2021.01); *B22F 10/77* (2021.01); *B22F 12/38* (2021.01); *B22F 12/90* (2021.01); *B22F 2201/11* (2013.01); *B22F 2201/12* (2013.01); *B22F 2202/13* (2013.01); *B22F 2203/00* (2013.01); *B33Y 30/00* (2014.12); *B33Y 50/02* (2014.12)

(58) Field of Classification Search
CPC .......... B22F 12/30; B22F 12/38; B22F 12/41; B22F 12/70; B22F 12/90; B22F 2201/03; B22F 2201/11; B22F 2201/12; B22F 2202/13; B22F 2203/00; B22F 2999/00; B33Y 10/00; B33Y 30/00; B33Y 50/02; Y02P 10/25
See application file for complete search history.

(56) References Cited

OTHER PUBLICATIONS

Jose Ruiz et al., "Study of the influence of Shielding Gases on Laser Metal Deposition of Inconel 718 Superalloy", Aug. 9, 2018, vol. 11, No. 8, 9, p. 1388, Materials and Methods; p. 3.

METHOD AND DEVICE FOR FEEDING GAS TO AN ADDITIVE MANUFACTURING SPACE

The present invention relates to a method and a device for feeding gas to an additive manufacturing space.

The main differences between processes for additive manufacturing (AM) are in the way layers are deposited to create parts and in the materials that are used. Some methods melt or soften the material to produce the layers, for example selective laser melting (SLM) or direct metal laser sintering (DMLS), selective laser sintering (SLS), fused deposition modeling (FDM), or fused filament fabrication (FFF), while others cure liquid materials using different sophisticated technologies. These additive manufacturing processes are summarized by the term laser powder bed fusion (L-PBF).

Selective laser sintering (SLS) is an additive manufacturing (AM) technique that uses a laser as the power source to sinter powdered material, aiming the laser automatically at points in space defined by a 3D model, binding the material together to create a solid structure. It is similar to direct metal laser sintering (DMLS). Both are instantiations of the same concept but differ in technical details. Selective laser melting (SLM) uses a comparable concept, but in SLM the material is fully melted rather than sintered, allowing different properties (crystal structure, porosity, and so on). SLS involves the use of a high power laser (for example, a carbon dioxide laser) to fuse small particles of plastic, metal, ceramic, or glass powders into a mass that has a desired three-dimensional shape. The laser selectively fuses powdered material by scanning cross-sections generated from a 3-D digital description of the part (for example from a CAD file or scan data) on the surface of a powder bed. After each cross-section is scanned, the powder bed is lowered by one layer thickness, a new layer of material is applied on top, and the process is repeated until the part is completed. Because finished part density depends on peak laser power, rather than laser duration, a SLS machine typically uses a pulsed laser.

Selective laser melting (DLMS) is a particular rapid prototyping, 3D printing, or Additive Manufacturing (AM) technique designed to use a high power-density laser to melt and fuse metallic powders together. In many SLM is considered to be a subcategory of Selective Laser Sintering (SLS). The SLM process has the ability to fully melt the metal material into a solid 3D-dimensional part unlike SLS. With selective laser melting, thin layers of atomized fine metal powder are evenly distributed using a coating mechanism onto a substrate plate, usually metal, that is fastened to an indexing table that moves in the vertical (Z) axis. This takes place inside a chamber containing a tightly controlled atmosphere of inert gas, either argon or nitrogen at oxygen levels below 500 to 1000 parts per million. Once each layer has been distributed, each 2D slice of the part geometry is fused by selectively melting the powder. This is accomplished with a high-power laser beam, usually a fiber laser with hundreds of watts. The laser beam is directed in the X and Y directions with two high frequency scanning mirrors. The laser energy is intense enough to permit full melting (welding) of the particles to form solid metal. The process is repeated layer after layer until the part is complete.

Direct metal laser sintering (DMLS) is an additive manufacturing metal fabrication technology, occasionally referred to as selective laser sintering (SLS) or selective laser melting (SLM), that generates metal prototypes and tools directly from computer aided design (CAD) data. It is unique from SLS or SLM because the process uses a laser to selectively fuse a fine metal powder. DMLS uses a variety of alloys, allowing prototypes to be functional hardware made out of the same material as production components. Since the components are built layer by layer, it is possible to design organic geometries, internal features and challenging passages that could not be cast or otherwise machined. DMLS produces strong, durable metal parts that work well as both functional prototypes or end-use production parts. The DMLS process begins with a 3D CAD model whereby a stl-file is created and sent to the machine's computer program. The DMLS machine uses a high-powered 200 watt Yb-fiber optic laser. Inside the build chamber area, there is a material dispensing platform and a built platform along with a recoater blade used to move new powder over the built platform. The technology fuses metal powder into a solid part by melting it locally using the focused laser beam. Parts are built up additively layer by layer, typically using layers 20 to 50 micrometers thick.

In general, additive manufacturing is a manufacturing technology that includes a methodology whereby a heat source melts a feedstock of material which is deposited onto a substrate. Computer control of the movement of the heat source, and the source of the feedstock, makes it possible to build complex components. In additive manufacturing the processing is not limited to the above-mentioned methods in which metal powders are processed but composites or polymers are processed. The heat source can include (but is not limited to) the already mentioned laser beam, an arc, or other plasma-based heat sources.

LMF processes take place in a process chamber that is filled with a process gas. Usually, an inert gas is used, in which the contaminants must be strictly controlled. For example, the oxygen content may not exceed a certain threshold between 1 ppm and 1000 ppm. Another example of contamination is the moisture present in the process space, which also needs to be tightly controlled. Further examples of impurities are nitrogen, hydrogen, $CO_2$ and other gases.

When a process chamber of an additive manufacturing device is opened to remove a manufactured component in order to begin production of a new component, ambient air enters the process chamber. This ambient air must be removed by purging the chamber with inert gas until an oxygen content has dropped to a certain threshold. The purging gas is introduced into the process chamber via one or more gas inlets. The purging of the chamber takes a relatively long time, especially when the threshold levels of impurities are low.

Another source of contamination is the powder itself, which may have absorbed impurities on the surface of the particles, which are then released during the melting process, thereby contaminating the process gas atmosphere. Therefore, a continuous cleaning process or Rinse process of the process chamber held to keep the impurities below an allowable threshold.

During additive manufacturing the laser sintering or laser melting of the powder feed requires inert gas protection as the resulting molten metal can be in the range of over 600° C. for alumina alloys or over 1500° C. for most other metals. It is vital that the melt pool be protected from high temperature oxidation from oxygen in the atmosphere. It is vital that oxygen levels are below 1000 ppm or for sensitive materials like titanium and its alloys, the requirement can be below 100 ppm and lower and for some other alloys very sensitive to oxygen can be as low as 10 ppm.

It is always necessary to protect the molten pool from oxidation as this can lead to well defects and the reduction in corrosion resistance and reduced mechanical properties and lower fatigue and fracture strength. This particularly is the case in creep resistant materials, alloy steels, stainless steels and its alloys, nickel and its alloys and titanium and its alloys. The usual method of protecting the cell/chamber is to purge the volume by passing a stream of an inert gas such as argon into the cell volume to reduce the oxygen level. This limits the availability of oxygen at the side of the laser melt pool to cause oxidation. Some materials suffer oxidation discoloration in reactive metals and embrittlement by oxygen.

A process chamber is mostly purged with an inert gas, generally argon and rarely nitrogen, to remove air from a built space and/or a process chamber. The oxygen content inside the chamber is at a level of about 0.1% $O_2$ (1000 ppm) after a purging process and during manufacturing process. This aims at reducing material oxidation.

The flow of inert gas ensures for example a clean laser path, the removal of fumes and spatter nearby the process area, where the laser hits the powder bed.

The nature and properties concerning thermal conductivity and density of the shielding gas are impacting significantly the components' properties concerning porosity. Most efforts to improve existing additive manufacturing techniques focus on laser parameters such as power, scanning speed etc. in order to optimize the Laser Powder Bed Process. Mostly a process gas is only used to ensure removal of fumes and spatter. In this context, the process window is narrow and processing speed is limited in order to achieve high density parts.

The scope of gases for Laser Powder Bed Fusion is today limited to Argon and/or Nitrogen, for their inert character to most metal powders available. However, while Argon is a noble gas, Nitrogen may dissociate and react with the high temperature metal, possibly forming nitrides.

It is an object of the present invention to provide an additive manufacturing method and a corresponding apparatus, in particular an L-PBMF method and an LPBMF device, in which an alternative gas and/or gas mixture is used for processing wherein a desired gas velocity can be achieved and wherein the process repeatability is ensured.

It is a further object of the present invention to provide an additive manufacturing method and a corresponding apparatus, in which a processing chamber and/or the process gas atmosphere can be freed of impurities efficiently and in a simple manner and more quickly.

It is a further object of the present invention to provide an improved method for additive manufacturing allowing a higher (laser) scanning speed.

One or more of these problems are solved by a method according to independent claims 1 and 8. Advantageous embodiments are defined in the sub-claims.

According to the present invention a method is provided for feeding a gas flow to an additive manufacturing space during a manufacturing process wherein the gas flow is established by a pump connected to the manufacturing space wherein the pump is controlled by a set differential pressure, and wherein the gas flow consists of Helium or the gas flow mainly consists of a gas mixture comprising 5 Vol.-% to 40 Vol.-% and preferably 30 Vol.-% Argon and 95 Vol.-% to 60 Vol.-% and preferably 70 Vol.-% Helium or the gas flow mainly consists of a gas mixture comprising 41 Vol.-% to 60 Vol.-% and preferably 50 Vol.-% Argon and 59 Vol.-% to 40 Vol.-% and preferably 50 Vol.-% Helium or the gas flow mainly consists of a gas mixture comprising 61 Vol.-% to 95 Vol.-% and preferably 70 Vol.-% Argon and comprising 39 Vol.-% to 5 Vol.-% and preferably 30 Vol.-% Helium.

Within the scope of the present invention the gas can have 10 ppm to 1000 ppm impurities.

Preferably the set differential pressure is 0.8 mbar to 0.16 mbar or is 0.1 mbar to 0.14 mbar and preferably 0.12 mbar when the gas flow consists of Helium and is 0.26 mbar to 0.34 mbar or is 0.28 mbar to 0.32 mbar and preferably 0.30 mbar when the gas flow consists of a gas comprising 5 Vol.-% to 40 Vol.-% and preferably 30 Vol.-% Argon and 95 Vol.-% to 60 Vol.-% and preferably 70 Vol.-% Helium (Varigon® He70) and is 0.37 mbar to 0.45 mbar or is 0.39 mbar to 0.43 mbar and preferably 0.41 mbar when the gas flow consists of a gas mixture comprising 41 Vol.-% to 60 Vol.-% and preferably 50 Vol.-% Argon and 59 Vol.-% to 40 Vol.-% and preferably 50 Vol.-% Helium (Varigon® He50) and is 0.55 mbar to 0.63 mbar or is 0.57 mbar to 0.61 mbar and preferably 0.59 mbar when the gas flow mainly consists of a gas mixture comprising 61 Vol.-% to 95 Vol.-% and preferably 70 Vol.-% Argon and comprising 39 Vol.-% to 5 Vol.-% and preferably 30 Vol.-% Helium (Varigon® He30).

The inventors of the present invention have recognized the following. The density of a shielding or processing gas is impacting significantly the gas velocity over a build platform. In case of gas (mixtures) with low density a pump of a L-PBF apparatus will need to run at higher power to achieve the same gas velocity as when using traditional Argon.

According to the present invention specific parameters especially relating to a set differential pressure have been developed to ensure a similar gas velocity. These differential pressure values are necessary to be able to process under Helium and Argon-Helium mixtures.

Additionally, current machine design does not allow for a stable residual oxygen level in the chamber under Helium (mixtures) as existing oxygen sensors are calibrated at ambient air.

The invention defines the differential pressure required to process under Helium and Helium-Argon mixtures. It details the correlation between gas, differential pressure and gas velocity.

The method according to the present invention allows to use new process gas with lower density with current machine design.

To ensure consistent residual oxygen levels in the build chamber an additional oxygen trace analyzer specifically calibrated to the process gas (Helium and He—Ar mixtures) can be implemented into a gas recirculation system of a machine Without the presented correlation, the gas velocity is likely not to be achieved nor maintained by the L-PBF machine. This correlation allows to widen the scope of available process gases for L-PBF to lighter gases and gas mixtures.

The oxygen trace analyzer further ensures the repeatability of the process.

A suitable oxygen monitoring and controlling system and an oxygen monitoring and controlling system system and method with a trace analyzer is disclosed for example in EP 3 075 470 A. This document is herewith incorporated by reference. EP 3 075 470 A discloses a method for producing a metallic workpiece in layers by additive manufacturing, in which metallurgical layers of the workpiece are produced by providing in each case a metallic material and a laser beam in a production chamber for each metallurgical layer, and during the application the layers of the metallic material in the production chamber, a gas atmosphere is provided. According to the invention, a part of the gas atmosphere is withdrawn as a gas stream from the production chamber, at least one parameter of the gas stream and/or the gas atmosphere determined and compared with a desired value. Depending on the comparison of the parameter with the desired value, the gas stream is returned to the production chamber and a process gas is supplied to the production chamber.

According to this monitoring system, part of the gas atmosphere is extracted from the manufacturing chamber in the form of a gas stream and fed to an analyzer. One or more parameters of the gas stream are determined in the analyzer. Since the gas atmosphere consists of inert Helium or Helium and Argon, it is frequently sensible to control the water vapor content of the gas stream or the oxygen content of the gas stream in order to determine if the gas atmosphere is still sufficiently inert. Otherwise, an undesirable formation of pores could take place in the interior of the workpiece.

The parameters such as, for example, the water vapor content or the oxygen content of the gas stream are measured and compared with a nominal value in the analyzer. If the measured parameters lie below the nominal value, i.e. if the water vapor content or the oxygen content lies below the predefined nominal value, the gas stream can be completely returned into the manufacturing chamber.

L-PBF machines using lasers of nominal power up to 400 W. A typical build platform surface is about 400 cm2 and building height is about 30 cm. The machines rely on the following principle to establish their protective atmosphere. The chamber is purged with an inert gas (generally Argon or Nitrogen) to remove air. As soon as the machine detects less than a few thousands ppm of oxygen, it starts to recirculate the chamber's atmosphere. The recirculated gas flow is established by a pump. The pump power will depend on the operator input, whom sets a differential pressure. This differential pressure is measured after the pump. The pump power is increased until the desired pressure is achieved and kept constant. The process is then allowed to start. For a given material and gas, the differential pressure is set to get a gas velocity of about 2.2 m/s. This allow for ensuring a clean laser—material interaction zone.

A gas mixture and/or a gas flow controlling system is be provided for controlling a gas flow of the gas mixture comprising Helium and Argon and/or a ratio of Helium to Argon in the gas mixture//

The gas can be recirculated via the gas recirculation system mentioned above, wherein a consistent residual oxygen levels in the manufacturing space is kept via an additional oxygen trace analyzer, which is specifically calibrated to the gas used and which is implemented into the gas recirculation.

The present invention defines the differential pressure required to process under Helium and Helium-Argon mixtures. It details the correlation between gas, differential pressure and gas velocity.

Figure 2:
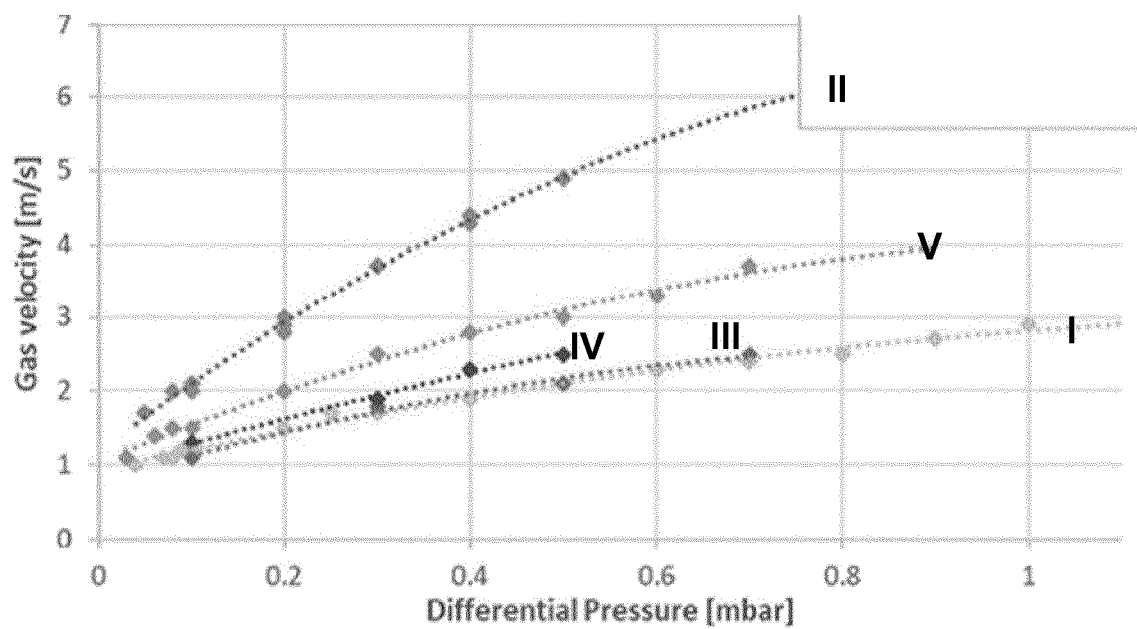

FIG. 2 displays the correlation between gas velocity and differential pressure for Helium (II) and the gas mixtures consisting mainly of 30 Vol.-% Argon and 70 Vol.-% Helium (V) (Varigon® He70), 50 Vol.-% Argon and 50 Vol.-% Helium (IV) (Varigon® He50), 70 Vol.-% Argon and 30 Vol.-% Helium (III) (Varigon® He30) and Helium according to the present invention.

On basis of this correlation an operator can control the gas velocity within the traditional range, for the processing gases mentioned above. This invention suggests working at 0.12 mbar in Helium, 0.30 mbar in 30 Vol.-% Argon and 70 Vol.-% Helium (V), 0.41 mbar in 50 Vol.-% Argon and 50 Vol.-% Helium (IV) and 0.59 mbar in 70 Vol.-% Argon and 30 Vol.-% Helium (III).

The inventors of the present invention have recognized that using Argon-Helium gas mixtures, is not possible using the traditional settings of the differential pressure developed for Argon. Without the correlation according to the present invention, the gas velocity is likely not to be achieved nor maintained by L-PBF machines.

This correlation allows widening the scope of available process gases for L-PBF to lighter gases and gas mixtures.

An oxygen level in the manufacturing space can be controlled via an oxygen monitoring system so that that the content of oxygen in the manufacturing space is reduced to a set predetermined level.

The oxygen level in the manufacturing space can be controlled via an oxygen monitoring system so that constant oxygen level is provided during processing as disclosed in EP 3 075 470 A.

Current machine design only accommodates the use of Argon or Nitrogen as shielding gas and cannot establish homogeneous process conditions for Helium and its mixtures. If a Helium Argon mixture is used in a not modified printer the gas flow could not be sufficient and the oxygen measurement could not work and show a wrong O2 value. Both issues will result in a non-reproducible process. In this context, the process window is narrow and processing speed is limited in order to achieve high density parts.

Therefore, oxygen level in the manufacturing space is controlled via the oxygen monitoring a controlling system so that that the content of oxygen in the manufacturing space is reduced to a set predetermined level and is kept at this level.

Preferably the trace analyzer as disclosed in EP 3 075 470 A is calibrated for Ar—He mixtures and can be used in the present invention. The oxygen trace analyzer further ensures the repeatability of the process. To ensure consistent residual oxygen levels in a build chamber the additional oxygen trace analyzer is specifically calibrated to the process gas (Helium and He—Ar mixtures) and has been implemented into the gas recirculation system of the machine.

The set predetermined level can be determined by the sensitivity of the powder to oxygen wherein the said oxygen level is preferably less than 1000 ppm or less than 100 ppm or less than 10 ppm.

Helium and Argon do not dissociate and not react with the material upon collision with a laser beam. However, Helium is lighter, has a higher thermal conductivity and ionization energy than Argon due to its inert nature, high thermal conductivity and ionization potential.

According to the present invention argon helium mixtures are used to achieve higher density laser powder bed fusion components with respect to density and a higher scanning speed. The present invention increases the final product quality and the productivity of the process.

Using Helium or Argon-Helium gas mixtures, high density of parts is achieved upon higher scanning speed compared to standard Argon atmosphere which can result in time reduction of an average build job and processing speed (scanning speed×hatching space×layer thickness) up to 40% as compared to standard scanning speeds while similar or better quality is achieved.

The argon helium gas mixtures according to the present invention comprises Helium and at least 5 Vol-% or 10 Vol-% or 15 Vol-% or 20 Vol-% or 25 Vol-% or 30 Vol-% or 35 Vol-% or 40 Vol-% or 50 Vol-% or 55 Vol-% or 60 Vol-% or 70 Vol-% or 75 Vol-% or 80 Vol-% or 85 Vol-% or 90 Vol-% or 95 Vol-% Argon or respectively comprises Helium and no more than 5 Vol-% 10 Vol-% or 15 Vol-% or 20 Vol-% or 25 Vol-% or 30 Vol-% or 35 Vol-% or 40 Vol-% or 50 Vol-% or 55 Vol-% or 60 Vol-% or 70 Vol-% or 75 Vol-% or 80 Vol-% or 85 Vol-% or 90 Vol-% or 95 Vol-% Argon.

With the gas mixtures according to the present invention a higher laser scanning speed can be achieved, wherein the full density of the part can be achieved. Laser parameter can be optimized with respect to the gas mixture and/or to the material of the metal powder.

Within the present invention additive manufacturing techniques like metal selective laser sintering, metal laser melting, direct metal printing, selective laser melting and direct metal laser sintering are comprised by the term laser metal fusion (L-PBF).

Current purging and gas shield methods are insufficient in that the oxygen and moisture levels are relatively high at the beginning of the melting process even though a purge cycle has taken place.

The present invention can also be defined as a method for additive manufacturing, wherein a part is built by selectively melting a material and building a part additively layer by layer using a heat source, preferably a laser, melting the material, wherein the process is conducted in a chamber and the chamber is purged and/or processed with a gas mixture comprising Helium and Argon as defined above.

The instant invention increases the scanning speed and displaces air that is present inside a manufacturing space or a corresponding component of an apparatus for additive manufacturing to be purged, thereby replacing the air and oxygen present therein with Helium and/or the gas mixture comprising Helium and Argon and also processing with this gas.

According to the present invention the manufacturing space can be a built space of a production unit defined by a wall of a housing of the production unit and a built platform of a lift table disposed inside the wall of the housing. Furthermore, the manufacturing space can be a process chamber of a device for additive manufacturing.

The method according to the present invention can comprise further manufacturing steps of additive manufacturing after the purging of the manufacturing space, namely the further steps of measuring an oxygen content in the manufacturing space, providing a metal powder on the built platform and providing a gas and/or a gas mixture according to the present invention for processing, as mentioned above, melting the metal powder with a heat source, namely a laser device and repeating the afore mentioned steps.

Furthermore, the noble gas mixture of Helium and Argon can be used to enhance the production of Ti-6Al-4V parts. The Helium and Argon mixture will not dissociate and not react with the material upon collision with the laser beam.

Furthermore, an apparatus for additive manufacturing according to the present invention is provided. This apparatus comprises a powder delivery system comprising a storage unit for metal powder and an application device for applying the powder onto a built platform, a heat source which is the device for generating a plasma or an arc for melting the powder, and a production unit for additive manufacturing using metal powders comprising a housing with a wall, a lift table with a built platform disposed inside the wall of the housing, wherein the wall of the housing and the built platform define a built space, and wherein a device for feeding a gas mixture comprising Helium and Argon to the manufacturing space is connected to the built space and/or to a process chamber of the device and wherein the gas flow to the additive manufacturing space is established by a pump connected to the manufacturing space wherein the pump is controlled by a set differential pressure, and wherein the set differential pressure is 0.12 mbar when the gas flow mainly consists of Helium and 0.30 mbar when the gas flow mainly consists of a gas mixture comprising 30 Vol.-% Argon and 70 Vol.-% Helium and 0.41 mbar when the gas flow mainly consists of a gas mixture comprising 50 Vol.-% Argon and 50 Vol.-% Helium and 0.59 mbar when the gas flow mainly consists of a gas mixture comprising 70 Vol.-% Argon and 30 Vol.-% Helium.

The same advantages mentioned in connection with the method for feeding gas additive manufacturing space according to the present invention apply mutatis mutandis to the apparatus for additive manufacturing according to the present invention.

Furthermore, the device for feeding a gas mixture comprising Helium and Argon comprises at least one storage vessel for a gas mixture comprising Helium and Argon or two separate storage vessels and a mixing device for providing the gas mixture in different ratios during manufacturing.

Furthermore, a feeding device like a nozzle and or a pump for feeding the gas mixture comprising Helium and Argon to the manufacturing space can be provided.

A gas mixture and/or a gas flow controlling system can be provided for controlling a gas flow of the gas mixture comprising Helium and Argon and/or a ratio of Helium to Argon in the gas mixture.

An oxygen controlling system with an oxygen sensor can be provided for controlling an oxygen level in the manufacturing space is controlled.

The oxygen sensor (electronic device) for measuring the proportion of oxygen (02) in the manufacturing space is provided in the manufacturing space, wherein the oxygen sensor is connected to a control unit and the control unit is connected to the device for feeding gas mixture comprising Helium and Argon for controlling the device for feeding a gas mixture comprising Helium and Argon according to the value measured by the oxygen sensor.

For the objects mentioned above, the oxygen monitoring and controlling system (comprising a trace analyzer) according to EP 3 075 470 A can be used.

The means for circulating or recirculating the process gas can be an axial or a radial fan of the apparatus for additive manufacturing. Fans can produce flow velocities an order of magnitude, or more, higher than natural convection. High pressure radial fans, combined with suitably shaped nozzles or outlet ducts for purging the manufacturing space for example according to the shape of the component can provide the gas mixture comprising Helium and Argon or efficiently. The use of a fan inside a chamber makes convenient use of the existing gas atmosphere in the chamber to provide the gas flow of the mixture comprising Helium and Argon.

Figure 3:
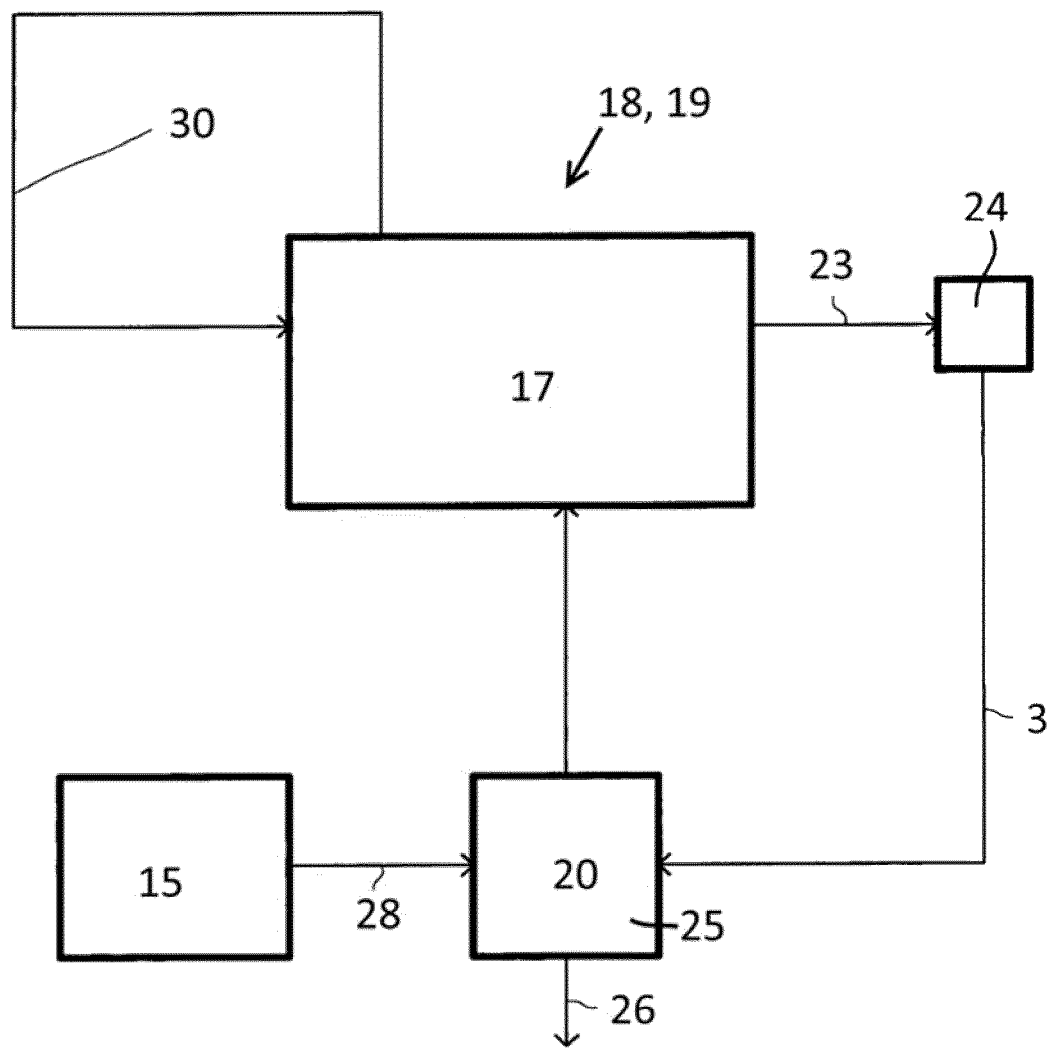

The invention is explained below with the aid of embodiments shown in the drawings. The drawings show in:

FIG. 1 a rough schematic view of a device for additive manufacturing according to the present invention, FIG. 2 a diagram showing the correlation between gas velocity and differential pressure for different gas concentration in a process atmosphere, and in FIG. 3 a rough schematic view of a system for additive manufacturing.

Hereinafter an apparatus for additive manufacturing 1 according to the present invention is explained in detail (FIGS. 1 and 2).

The apparatus 1 comprises a production unit 2, a delivery unit 3 and a heat source 4.

The heat source 4 according to a preferred embodiment comprises a laser and a corresponding scanner system for melting metal powder (not shown).

The delivery unit 3 or delivery cylinder respectively comprises a housing 5 with a wall 6 wherein a powder delivery piston 7 is disposed inside the housing 5.

A powder applying device 8, for example a roller, is provided for pushing a metal powder from the delivery unit 3 to the production unit 2.

The production unit 3 comprises a housing 9 with a wall 10. In a view form above the cylindrical production unit 3 can have a rectangular- or a square- or a round shape and can be defined as production cylinder 3.

A lift table 11 with a built platform 12 is disposed inside the wall 10 of the housing 9. The lift table 11 and the corresponding built platform 12 embody a fabrication piston.

The wall 10 of the housing 9 and the built platform 12 of the lift table 11 of the production unit 2 define a built space 13.

The built space 13 houses the fabrication powder bed and therefore the object being fabricated.

The built platform 12 can be an integral part of the lift table 11 of the fabrication piston or a separate part connected to the lift table 11.

Furthermore a processing chamber 17 is provided surrounding the production unit 2, the delivery unit 3 and the heat source 4, for example a laser and preferably a fiber laser.

The manufacturing space 20 according to the present invention is therefore the build space 13 of the production unit 2 defined by the 10 wall of the housing 9 of the production unit 2 and the lift table 11 with the built platform 12 disposed inside the wall 10 of the housing 9, and/or the manufacturing space is the room within the processing chamber 17.

According to the present invention a device 14 for feeding a gas, namely helium or a gas mixture comprising Helium and Argon to the manufacturing is connected to the processing chamber 17 of the apparatus 1.

The mixture comprises Argon and 10 Vol-% to 75 Vol-% Helium or 30 Vol-% to 50 Vol-% Helium.

The argon helium gas comprises Helium and at least 10 Vol-% or 15 Vol-% or 20 Vol-% or 25 Vol-% or 30 Vol-% or 35 Vol-% or 40 Vol-% or 50 Vol-% or 55 Vol-% or 60 Vol-% or 70 Vol-% or 75 Vol-% Argon or respectively comprises Helium and no more than 10 Vol-% or 15 Vol-% or 20 Vol-% or 25 Vol-% or 30 Vol-% or 35 Vol-% or 40 Vol-% or 50 Vol-% or 55 Vol-% or 60 Vol-% or 70 Vol-% or 75 Vol-% Argon.

The Helium and/or the mixture of Helium and Argon can be used as purge gas as well as a process gas.

The device 14 for feeding a gas mixture comprising Helium and Argon to the manufacturing space comprises at least storage vessel 15 for the gas mixture comprising Helium and Argon to the manufacturing and a feeding device 16 like a duct and/or a nozzle and/or a pump for feeding the gas mixture comprising Helium and Argon to the manufacturing space.

A gas mixture and/or a gas flow controlling system is be provided for controlling a gas flow of the gas mixture comprising Helium and Argon and/or a ratio of Helium to Argon in the gas mixture.

Alternatively two vessels are provided wherein in one vessel the Helium is stored and in the other vessel the Argon is stored (not shown). According to such an embodiment a mixing device is provided for mixing the Argon and Helium in a predetermined value according to the present invention. The mixing device is then part of the device 14 for feeding a gas mixture comprising Helium and Argon to the manufacturing space Furthermore an oxygen sensor (not shown) for measuring the proportion of oxygen ($O_2$) in the manufacturing space 20 is provided in the manufacturing space 20.

An external oxygen controlling system 19 with the oxygen sensor is provided for controlling an oxygen level in the manufacturing space.

The gas mixture and/or a gas flow controlling system 18, 14 for controlling a gas flow of the gas mixture comprising Helium and Argon and/or a ratio of Helium to Argon in the gas mixture and the oxygen monitoring and controlling system 19 for recirculating the gas flow, wherein a consistent residual oxygen levels in the manufacturing space is kept via an oxygen trace analyzer can be embodied in a single system.

Pressure sensors 31, 32 are provided for measuring the differential pressure.

A suitable oxygen monitoring and controlling system 19 and a as flow monitoring and controlling system 18 is disclosed for example in EP 3 075 470 A. This document is herewith incorporated by reference. EP 3 075 470 A discloses a method for producing a metallic workpiece in layers by additive manufacturing, in which metallurgical layers of the workpiece are produced by providing in each case a metallic material and a laser beam in a production chamber for each metallurgical layer, and during the application the layers of the metallic material in the production chamber, a gas atmosphere is provided. According to the invention, a part of the gas atmosphere is withdrawn as a gas stream from the production chamber, at least one parameter of the gas stream and/or the gas atmosphere determined and compared with a desired value. Depending on the comparison of the parameter with the desired value, the gas stream is returned to the production chamber and a process gas is supplied to the production chamber.

According to this monitoring system 19, part of the gas atmosphere is extracted from the manufacturing chamber in the form of a gas stream and fed to an analyzer 24. One or more parameters of the gas stream are determined in the analyzer. Since the gas atmosphere consists of inert Helium or Helium and Argon, it is frequently sensible to control the water vapor content of the gas stream or the oxygen content of the gas stream in order to determine if the gas atmosphere is still sufficiently inert. Otherwise, an undesirable formation of pores could take place in the interior of the workpiece.

The parameters such as, for example, the water vapor content or the oxygen content of the gas stream are measured and compared with a nominal value in the analyzer. If the measured parameters lie below the nominal value, i.e. if the water vapor content or the oxygen content lies below the predefined nominal value, the gas stream can be completely returned into the manufacturing chamber.

The oxygen sensor (electronic device) for measuring the proportion of oxygen ($O_2$), which is part of an oxygen monitoring and controlling system 19 in the manufacturing space is provided in the manufacturing space, wherein the oxygen sensor is connected to a control unit 25 and the control unit is connected to the device for feeding gas mixture comprising Helium and Argon 14 for controlling the device for feeding a gas mixture comprising Helium and Argon 14 according to the value measured by the oxygen sensor.

The apparatus for additive manufacturing 1 establishes its atmosphere by first purging the chamber and then, when it measures that oxygen is less than a given value (often 1000 ppm $O_2$), it starts to recirculate the gas mixture. Leakages and other side effects are compensated by a holding flow.

The process gas flow for processing in the additive manufacturing space is established by a pump 16 connected to the manufacturing space wherein the pump is controlled by a set differential pressure. The set differential pressure is 0.8 mbar to 0.16 mbar or is 0.1 mbar to 0.14 mbar and preferably 0.12 mbar when the gas flow consists of Helium (II) and is 0.26 mbar to 0.34 mbar or is 0.28 mbar to 0.32 mbar and preferably 0.30 mbar when the gas flow consists of a gas mixture comprising 30 Vol.- Argon and 70 Vol.-% Helium (V) and is 0.37 mbar to 0.45 mbar or is 0.39 mbar to 0.43 mbar and preferably 0.41 mbar when the gas flow consists of a gas mixture comprising 50 Vol.-% Argon and 50 Vol.-% Helium (IV) and is 0.55 mbar to 0.63 mbar or is 0.57 mbar to 0.61 mbar and preferably 0.59 mbar when the gas flow mainly consists of a gas mixture comprising 70 Vol.-% Argon and 30 Vol.-% Helium (III)(FIG. 2).

The L-PBF machines are equipped with different kind of oxygen sensors, i.e. electro-chemical cells, ceramic sensors, etc. The calibration procedure and sensor operating range may vary from one OEM to another. To use an oxygen sensor in the most rigorous way, the latter should be calibrated at several points close to the targeted oxygen range within the used process gas for the process. However, since most of the end users are not yet aware of this issue, the regular use of calibration gas is not common manner. Usually the chamber oxygen sensors are calibrated in air by opening the chamber door. The sensor is calibrated at 20.9% $O_2$ while the operating range is usually 0.1% $O_2$ or below. Therefore, the one-point calibration may lead to inaccurate measurement during the process.

Besides, the effect of different species present in the chamber atmosphere may affect the measurement of the sensor, creating undesired deviations. For example, it is known that ceramic sensors (i.e. also called Lambda probes) are sensitive to the presence of hydrogen which may come from humidity in the air and feedstock. Another example is the dependence on gas molar mass for electro-chemical sensors, since oxygen will diffuse slower within a high molecular weight gas. Argon has a higher molecular weight than air, thus the oxygen will be underestimated. Helium, has a lower molecular weight than air, thus the oxygen will be overestimated.

In addition, one may question the machine's sensor position. In general, the machine design is so that the oxygen sensor is relatively away from the zone of interest, i.e. the laser-powder matter interaction area. For example, a sensor placed at the top of the chamber, may not be representative of the process and could be influenced by the shielding gas density.

By sampling a little bit of gas next to the baseplate, a measurement of the oxygen representative of the melt pool surrounding is performed.

Therefore it is necessary to adjust the gas flow and to control the oxygen level with an external system which is the external oxygen controlling system. These conditions allowed for a proper process projections removal.

In the simplest type of an automatic control loop, a controller compares a measured oxygen value of the process with a desired set value, and processes the resulting error signal to change some input to the process, in such a way that the process reaches the set oxygen point despite disturbances.

FIG. 3 schematically shows a processing chamber 17 for producing a workpiece by means of additive manufacturing. The finished workpiece is composed of different metallurgical layers that are individually produced in succession. The individual metallurgical layers of the work niece are respectively produced in that a metallic material is respectively provided inn each metallurgical layer and acted upon with a laser beam. This takes place under a gas atmosphere in the processing chamber 17. The gas atmosphere in the processing chamber 17 consists, for example, of Helium or one of the above mentioned gas mixtures comprising Argon and Helium, that was introduced into the processing chamber 17 prior to the beginning of the manufacturing process.

A part of the gas atmosphere is extracted from the processing chamber 17 in the form of a gas stream 23 and fed to an analyzer 24. One or more parameters of the gas stream 23 are determined in the analyzer 24. If the gas atmosphere consists of an inert gas as in the described example, it is frequently sensible to control the water vapor content of the gas stream 23 or the oxygen content of the gas stream 23 in order to determine if the gas atmosphere is still sufficiently inert. Otherwise, an undesirable formation of pores could take place in the interior of the workpiece.

The parameters such as, for example, the water vapor content or the oxygen content of the gas stream 23 are measured and compared with a nominal value in the analyzer 24. If the measured parameters lie below the nominal value, i.e. if the water vapor content or the oxygen content lies below the predefined nominal value, the gas stream 23 is completely returned into the processing chamber 17.

However, if the water vapor content or the oxygen content is higher than the nominal value, the gas stream is partially or completely discarded. To this end, the analyzed gas stream 23 is fed to a gas control unit 25, which either returns the gas stream 23 into the processing chamber 17 or discards or feeds a partial stream 26 or the entire gas stream 25 to a system in order to be used otherwise depending on the result of the comparison between the measured parameter and the nominal value.

The part of the gas stream 23, which is no longer returned into the processing chamber 17, is replaced with the process gas 27. In the present example, pure Helium is used as the process gas 27. The process gas is likewise fed to the gas control unit 25 (stream 7), admixed to the gas stream 23 and then introduced into the processing chamber 17 (stream 29).

Furthermore another circuit 30 that continuously extracts part of the gas atmosphere from the processing chamber 17 and once again returns this part of the gas atmosphere into the processing chamber 17. In this way, the gas atmosphere is recirculated and thereby homogenized.

Unless otherwise stated, all technical features described in connection with the embodiments of the apparatus are applicable in connection with method steps for the method according to the present invention.

According to the present invention a method is provided for Method for feeding a gas flow to an additive manufacturing space during a manufacturing process wherein the gas flow is established by a pump connected to the manufacturing space wherein the pump is controlled by a set differential pressure, and wherein the gas flow mainly consists of Helium or the gas flow mainly consists of a gas mixture comprising 30 Vol.-% Argon and 70 Vol.-% Helium or the gas flow mainly consists of a gas mixture comprising 50 Vol.-% Argon and 50 Vol.-% Helium or the gas flow mainly consists of a gas mixture comprising 70 Vol.-% Argon and 30 Vol.-% Helium.

The set differential pressure is 0.8 mbar to 0.16 mbar or is 0.1 mbar to 0.14 mbar and preferably 0.12 mbar when the gas flow consists of Helium and is 0.26 mbar to 0.34 mbar or is 0.28 mbar to 0.32 mbar and preferably 0.30 mbar when the gas flow consists of a gas mixture comprising 30 Vol.-% Argon and 70 Vol.-% Helium and is 0.37 mbar to 0.45 mbar or is 0.39 mbar to 0.43 mbar and preferably 0.41 mbar when the gas flow consists of a gas mixture comprising 50 Vol.-% Argon and 50 Vol.-% Helium and is 0.55 mbar to 0.63 mbar or is 0.57 mbar to 0.61 mbar and preferably 0.59 mbar when the gas flow mainly consists of a gas mixture comprising 70 Vol.-% Argon and 30 Vol.-% Helium.

An oxygen level in the manufacturing space is controlled via an oxygen monitoring and controlling system so that that the content of oxygen in the manufacturing space is reduced to a set predetermined level.

The gas is recirculated via a gas recirculation system.

Thereby the content of oxygen in the manufacturing space is reduced to a set predetermined level.

The set predetermined level is determined by the sensitivity of the powder to oxygen wherein the set oxygen level is preferably less than 1000 ppm or less than 100 ppm or less than 10 ppm.

The method comprises the further steps of:
providing a metal powder on the built platform,
melting the metal powder with a heat source and providing a process gas to the area of the built platform.

Then the aforementioned steps are repeated.

In the following further method steps are provided which can be combined with the present invention for measuring the oxygen level and recirculating the gas flow and which are already known from EP 3 075 470 A.

In a method for producing a metallic workpiece in layers by additive manufacturing, wherein metallurgical layers of the metallic workpiece are produced by providing a metallic material for each of the metallurgical layers in a manufacturing chamber and acting upon the metallic material with a laser beam, and wherein a gas atmosphere is in the manufacturing chamber during the acting upon the metallurgical layers, the method comprising:
extracting a part of the gas atmosphere from the manufacturing chamber;
comparing at least one parameter of the part of the gas atmosphere with a nominal value; and
determining from the comparing (i) what amount of the part of the gas atmosphere will be returned if at all to the manufacturing chamber, and (ii) whether feeding a process gas to the manufacturing chamber will be necessary for maintaining the manufacturing chamber at a constant pressure.

In a similar method for producing a metallic workpiece in layers by additive manufacturing, wherein metallurgical layers of the metallic workpiece are produced by providing a metallic material for each of the metallurgical layers in a manufacturing chamber and acting upon the metallic material with a laser beam, and wherein a gas atmosphere is in the manufacturing chamber during the acting upon the metallurgical layers, the method comprising:
extracting a part of the gas atmosphere as a gas stream from the manufacturing chamber;
comparing at least one parameter of the gas steam with a nominal value; and
determining from the comparing (i) what amount of the gas stream will be returned if at all to the manufacturing chamber, and (ii) whether feeding a process gas to the manufacturing chamber will be necessary for maintaining the manufacturing chamber at a constant pressure.

The determining the at least one parameter of the gas atmosphere is selected from the group consisting of water vapor content, oxygen content, carbon content, and temperature of the gas atmosphere.

Feeding the process gas to the manufacturing chamber if at least one of water vapor content and oxygen content of the part of the gas atmosphere are greater than the nominal value.

Maintaining an oxygen content in the gas atmosphere at a constant value in a range of between 50 ppm and 1000 ppm.

The determining of the at least one parameter takes place in the manufacturing chamber.

The gas atmosphere for the metallurgical layers is a gas selected from Helium or the gas mixture comprising 30 Vol.-% Argon and 70 Vol.-% Helium or the gas flow mainly consists of a gas mixture comprising 50 Vol.-% Argon and 50 Vol.-% Helium or the gas flow mainly consists of a gas mixture comprising 70 Vol.-% Argon and 30 Vol.-% Helium.

The metallic material can comprise a low-melting metal, wherein the low-melting metal comprises a melting point selected from the group consisting of not greater than 1500° C., or not greater than 1200° C. or not greater than 1000° C.

Wherein the amount from the determining from the comparing is selected from the group consisting of completely returning the part to the manufacturing chamber, partially returning the part to the manufacturing chamber, and not returning the part to the manufacturing chamber.

LIST OF REFERENCE NUMBERS 1 device
2 production unit
3 delivery unit
4 heat source
5 housing
6 wall
7 powder delivery piston
8 powder applying device
9 housing
10 wall
11 lift table
12 built platform
13 build space
14 device for feeding a gas and/or a gas mixture comprising Helium and Argon
15 storage vessel
16 feeding device/pump
17 processing chamber
18 gas flow controlling system
19 oxygen monitoring and controlling system
20 manufacturing space
21 conduit
23 gas stream
24 analyzer
25 control unit
26 partial stream
27 process gas
28 stream
29 stream
30 circuit
31 pressure sensor
32 pressure sensor

The invention claimed is:

1. A method for feeding a gas flow to an additive manufacturing space during a manufacturing process, comprising:

providing a metal powder on a built platform,
melting the metal powder with a heat source, and
repeating the aforementioned steps,
wherein the gas flow is established by a pump connected to the manufacturing space wherein the pump is controlled by a set differential pressure,
wherein the set differential pressure is 0.08 mbar to 0.16 mbar when the gas flow consists of Helium, and
wherein the set differential pressure is 0.26 mbar to 0.34 mbar when the gas flow comprises 5 Vol.-% to 40 Vol.-% Argon and 95 Vol.-% to 60 Vol.-% Helium,
wherein the set differential pressure is 0.37 mbar to 0.45 mbar when the gas flow comprises 41 Vol.-% to 60 Vol.-% Argon and 59 Vol.-% to 40 Vol.-% Helium and
wherein the set differential pressure is 0.55 mbar to 0.63 mbar when the gas flow comprises 61 Vol.-% to 95 Vol.-% Argon and 39 Vol.-% to 5 Vol.-%.

2. The method according to claim 1, wherein the manufacturing space is a build space of a production unit defined by a wall of a housing of the production unit and a lift table with a built platform of a lift table disposed inside the wall of the housing, or in that the manufacturing space is a process chamber of an apparatus for additive manufacturing.

3. The method according to claim 1, wherein an oxygen level in the manufacturing space is controlled via an oxygen monitoring and controlling system so that the content of oxygen in the manufacturing space is reduced to a set predetermined level.

4. The method according to claim 1, wherein the gas is recirculated via a gas recirculation system.

5. The method according to claim 4, wherein the set predetermined level is determined by the sensitivity of the powder to oxygen wherein the set oxygen level is less than 1000 ppm or less than 100 ppm or less than 10 ppm.

6. The method according to claim 4, wherein the set predetermined level is determined by the sensitivity of the powder to oxygen wherein the set oxygen level is less than 100 ppm.

7. The method according to claim 4, wherein the set predetermined level is determined by the sensitivity of the powder to oxygen wherein the set oxygen level is less than 10 ppm.

8. The method according to claim 1, wherein the set differential pressure wherein the set differential pressure is 0.1 mbar to 0.14 mbar when the gas flow consists of Helium.

9. The method according to claim 1, wherein the set differential pressure is 0.28 mbar to 0.32 mbar when the gas of the gas flow comprises 5 Vol.-% to 40 Vol.-% Argon and 95 Vol.-% to 60 Vol.-% Helium.

10. The method according to claim 1, wherein the set differential pressure is 0.39 mbar to 0.43 mbar when the gas of the gas flow comprises 41 Vol.-% to 60 Vol.-% Argon and 59 Vol.-% to 40 Vol.-% Helium.

11. The method according to claim 1, wherein the set differential pressure is 0.57 mbar to 0.61 mbar when the gas of the gas flow comprises 61 Vol.-% to 95 Vol.-% Argon and 39 Vol.-% to 5 Vol.-% Helium.

12. An apparatus for additive manufacturing comprising
a powder delivery system comprising a storage unit for metal powder and an application device for applying the powder onto a built platform,
a heat source which is a device for generating a plasma or an arc or laser radiation for melting the powder, and
a housing with a wall,
a lift table with a built platform disposed inside the wall of the housing, wherein the wall of the housing and the built platform define a build space, and
a device for feeding gas mixture comprising Helium or Helium and Argon to the manufacturing space is connected to the build space and/or to a process chamber of the device,
wherein the gas flow to the additive manufacturing space is established by a pump connected to the manufacturing space wherein the pump is controlled by a set differential pressure, and
wherein the set differential pressure is
08 mbar to 0.16 mbar when the gas flow consists of Helium,
is 0.26 mbar to 0.34 mbar when the gas flow comprises 5 Vol.-% to 40 Vol.-% Argon and 95 Vol.-% to 60 Vol.-% Helium,
is 0.37 mbar to 0.45 mbar when the gas flow comprises 41 Vol.-% to 60 Vol.-% Argon, and 59 Vol.-% to 40 Vol.-% Helium, and
is 0.55 mbar to 0.63 mbar when the gas flow comprises 61 Vol.-% to 95 Vol.-% Argon and comprising 39 Vol.-% to 5 Vol.-% Helium.

13. The apparatus according to claim 12, wherein an oxygen monitoring and controlling system is provided for recirculating the gas flow, wherein a consistent residual oxygen level in the manufacturing space is kept via an oxygen trace analyzer calibrated to the gas used and is implemented into the gas flow that is recirculated.

14. The apparatus according to claim 12, characterized in that, a gas mixture and/or a gas flow controlling system is provided for controlling a gas flow of the gas mixture comprising Helium and Argon and/or a ratio of Helium to Argon in the gas mixture.

15. The apparatus according to claim 12, wherein the set differential pressure wherein the set differential pressure is 0.1 mbar to 0.14 mbar when the gas flow consists of Helium.

16. The apparatus according to claim 12, wherein the set differential pressure is 0.28 mbar to 0.32 mbar when the gas of the gas flow comprises 5 Vol.-% to 40 Vol.-% Argon and 95 Vol.-% to 60 Vol.-% Helium.

17. The apparatus according to claim 12, wherein the set differential pressure is 0.39 mbar to 0.43 mbar when the gas of the gas flow comprises 41 Vol.-% to 60 Vol.-% Argon and 59 Vol.-% to 40 Vol.-% Helium.

18. The apparatus according to claim 12, wherein the set differential pressure is 0.57 mbar to 0.61 mbar when the gas of the gas flow comprises 61 Vol.-% to 95 Vol.-% Argon and 39 Vol.-% to 5 Vol.-% Helium.

* * * * *